(12) United States Patent
Yen et al.

(10) Patent No.: US 12,333,155 B2
(45) Date of Patent: *Jun. 17, 2025

(54) FLASH MEMORY CONTROLLER AND DATA READING METHOD

(71) Applicant: Silicon Motion Inc., Hsinchu (TW)

(72) Inventors: Hsiao-chang Yen, Hsinchu (TW); Tsu-han Lu, Hsinchu (TW)

(73) Assignee: Silicon Motion Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,098

(22) Filed: Feb. 5, 2024

(65) Prior Publication Data

US 2024/0402914 A1 Dec. 5, 2024

(30) Foreign Application Priority Data

Jun. 2, 2023 (TW) .................................. 112120777

(51) Int. Cl.
*G06F 3/06* (2006.01)
(52) U.S. Cl.
CPC .......... *G06F 3/0619* (2013.01); *G06F 3/0634* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | |
|---|---|---|
| 7,454,586 B2 | 11/2008 | Shi et al. |
| 11,331,924 B2 | 5/2022 | Gardner et al. |
| 11,494,261 B2 | 11/2022 | Achtenberg et al. |
| 2015/0046637 A1 | 2/2015 | Chien et al. |
| 2021/0342100 A1 | 11/2021 | Cerafogli et al. |

*Primary Examiner* — Kevin Verbrugge
(74) *Attorney, Agent, or Firm* — Nathan & Associates Patent Agents Ltd.; Menachem Nathan

(57) ABSTRACT

A flash memory controller and a data reading method are provided. The flash memory controller includes a control logic circuit and a processor. The control logic circuit is coupled to a first chip-enable-signal controlled area of a flash memory through a channel to transmit data and commands. The processor controls the control logic circuit to transmit a first command and a second command to the first chip-enable-signal controlled area through the channel. The first command is configured to instruct the first chip-enable-signal controlled area to read stored data and read operating temperature information. In response to the transmission of the second command, the processor controls the control logic circuit to receive at least one of the stored data and the operating temperature information from the first chip-enable-signal controlled area.

20 Claims, 7 Drawing Sheets

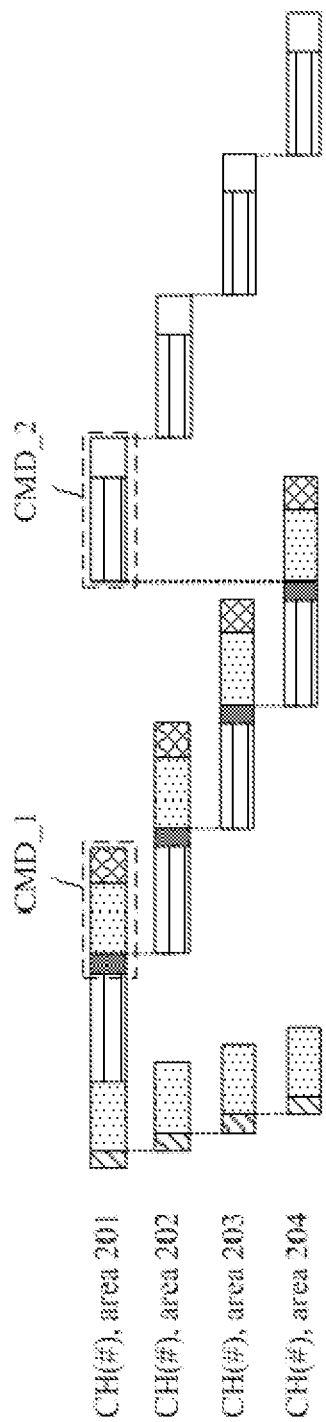
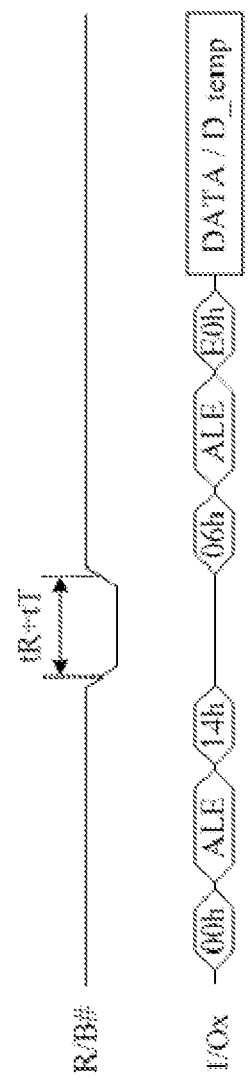
FIG. 4
FIG. 5

FLASH MEMORY CONTROLLER AND DATA READING METHOD

CROSS REFERENCE TO RELATED APPLICATIONS

This application claims priority to Taiwan Application Serial No. 112120777, filed Jun. 2, 2023, the disclosure of which is incorporated herein by reference.

FIELD OF DISCLOSURE

The present disclosure relates to a storage device, in particular to a flash memory controller and a data reading method.

BACKGROUND

Data reliability of memory devices will be affected by temperature. For example, a temperature of a memory device will increase as a data access speed of the memory device increases. If the temperature is higher than an allowable operating range, unpredictable errors are prone to occur when executing read or write commands, and even cause the memory device to fail.

Accordingly, it is necessary to provide a flash memory controller and a data reading method to solve the above technical problems.

SUMMARY OF DISCLOSURE

In order to solve the above-mentioned problems in the prior art, an object of the present disclosure is to provide a flash memory controller and a data reading method, which can make the flash memory that performs a read operation quickly return operating temperature information.

In a first aspect, the present disclosure provides a flash memory controller for controlling a flash memory. The flash memory includes a first chip-enable-signal controlled area, and the flash memory controller includes a control logic circuit and a processor. The control logic circuit is coupled to the first chip-enable-signal controlled area of the flash memory through at least one channel to transmit data and commands. The processor is coupled to the control logic circuit to access the first chip-enable-signal controlled area on the channel through the control logic circuit. The processor controls the control logic circuit to transmit a read command sequence to the first chip-enable-signal controlled area through the channel. The read command sequence includes a first command and a second command, the first command is configured to instruct the first chip-enable-signal controlled area to read stored data and read operating temperature information, and in response to the transmission of the second command, the processor controls the control logic circuit to receive at least one of the stored data and the operating temperature information from the first chip-enable-signal controlled area.

In some embodiments, the receiving of the stored data is adjacent to the receiving of the operating temperature information in time sequence.

In some embodiments, the first command is transmitted before the second command.

In some embodiments, the flash memory further includes a second chip-enable-signal controlled area. The processor controls the control logic circuit to transmit another first command to the second chip-enable-signal controlled area through the channel after the processor controls the control logic circuit to transmit the first command to the first chip-enable-signal controlled area through the channel and before the second command is transmitted to the first chip-enable-signal controlled area.

In some embodiments, the transmission of the another first command is adjacent to a transmission of an address receiving command corresponding to the second command in time sequence.

In some embodiments, the processor controls the control logic circuit to transmit an address receiving command corresponding to a data read command or an address receiving command corresponding to another first command to the first chip-enable-signal controlled area through the channel after the processor controls the control logic circuit to receive the operating temperature information from the first chip-enable-signal controlled area.

In some embodiments, the flash memory controller operates in a cache access mode.

In some embodiments, there is no command instructing the first chip-enable-signal controlled area to read another operating temperature information in another read command sequence transmitted before or after the read command sequence.

In some embodiments, in response to the transmission of the second command, the processor determines to receive the stored data or the operating temperature information according to an address receiving command corresponding to the second command.

In some embodiments, the first command and the second command are selected from a command set defined in an Open NAND Flash Interface (ONFI) specification.

In a second aspect, the present disclosure also provides a data reading method. The data reading method is executed by a flash memory controller coupled to a flash memory. The flash memory includes a first chip-enable-signal controlled area, the flash memory controller is coupled to the first chip-enable-signal controlled area of the flash memory through at least one channel to transmit data and commands. The data reading method includes: transmitting a first command to the first chip-enable-signal controlled area through the channel, where the first command is configured to instruct the first chip-enable-signal controlled area to read stored data and operating temperature information; transmitting a second command to the first chip-enable-signal controlled area through the channel; and receiving at least one of the stored data and the operating temperature information from the first chip-enable-signal controlled area in response to the transmission of the second command.

In some embodiments, the receiving of the stored data is adjacent to the receiving of the operating temperature information in time sequence.

In some embodiments, the first command is transmitted before the second command.

In some embodiments, the flash memory further includes a second chip-enable-signal controlled area; and after the flash memory controller transmits the first command to the first chip-enable-signal controlled area through the channel and before the second command is transmitted to the first chip-enable-signal controlled area, the data reading method further includes: transmitting another first command to the second chip-enable-signal controlled area through the channel.

In some embodiments, the transmission of the another first command is adjacent to a transmission of an address receiving command corresponding to the second command in time sequence.

In some embodiments, after the flash memory controller receives at least one of the stored data and the operating temperature information from the first chip-enable-signal controlled area, the data reading method further includes: transmitting an address receiving command corresponding to a data read command or an address receiving command corresponding to another first command to the first chip-enable-signal controlled area through the channel.

In some embodiments, the flash memory controller operates in a cache access mode.

In some embodiments, the first command and the second command together form a read command sequence, and there is no command instructing the first chip-enable-signal controlled area to read another operating temperature information in another read command sequence transmitted before or after the read command sequence.

In some embodiments, in response to the transmission of the second command, the flash memory controller determines to receive the stored data or the operating temperature information according to an address receiving command corresponding to the second command.

In some embodiments, the first command and the second command are selected from a command set defined in an Open NAND Flash Interface (ONFI) specification.

In comparison with the prior art, the present disclosure provides the flash memory controller and the data reading method, where the acquisition of the stored data and the operating temperature information can be realized by executing the read command sequence. Thus, time-consuming waiting for the completion of all channel operations is prevented and/or time consumption caused by having to end a cache read operation is prevented.

BRIEF DESCRIPTION OF DRAWINGS

FIG. 4 illustrates a timing diagram of read operations in an interleaved fashion at one channel among a flash memory according to a second embodiment of the present disclosure.

FIG. 5 illustrates a timing diagram for a read command sequence according to the second embodiment of the present disclosure.

DETAILED DESCRIPTION

Figure 1:
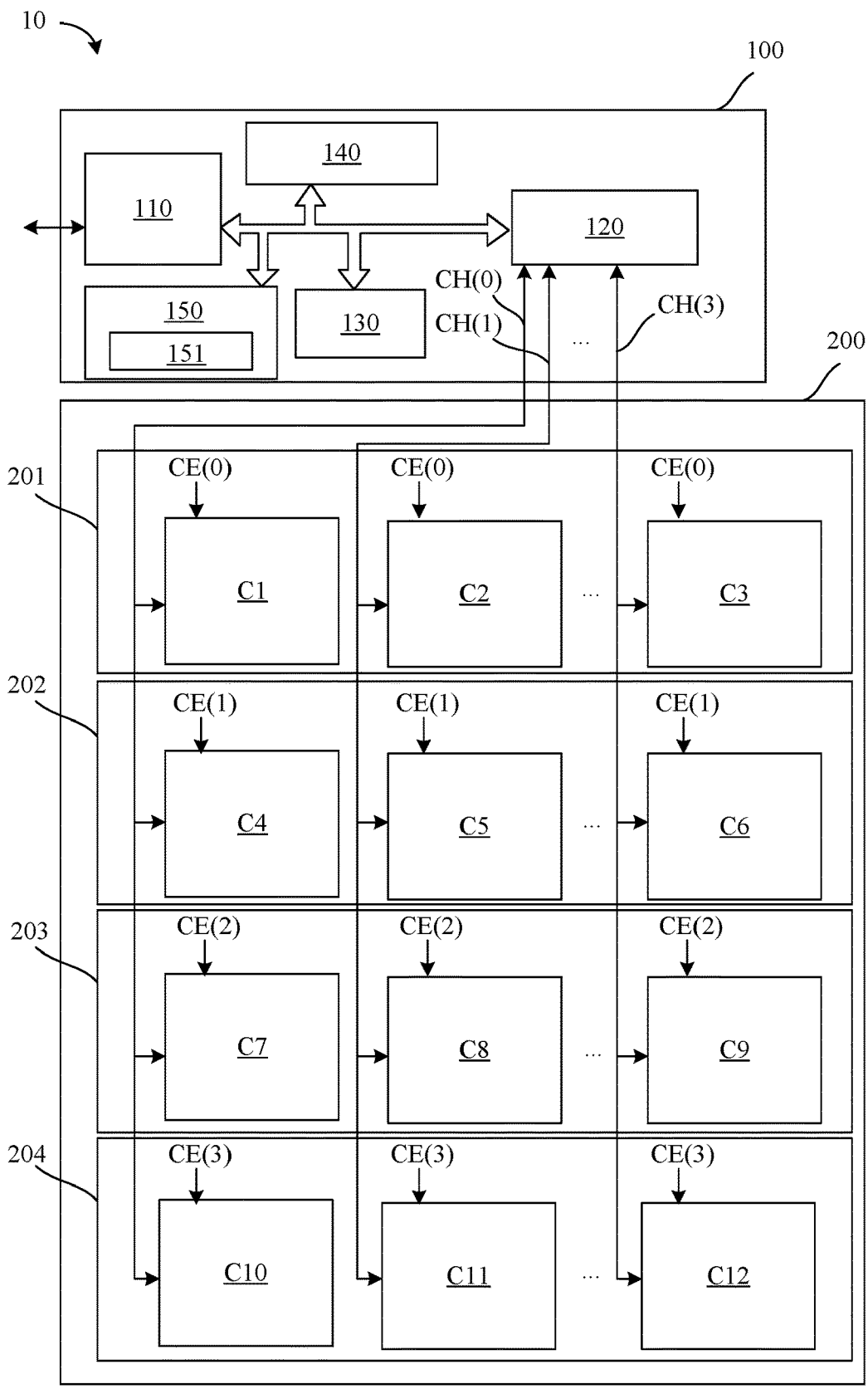
FIG. 1 illustrates a schematic diagram of a memory device of an embodiment of the present disclosure.

Exemplary embodiments of the present disclosure will now be described more fully with reference to the accompanying drawings. The exemplary embodiments may, however, be embodied in many forms and should not be construed as limited to the embodiments set forth herein. Rather, these embodiments are provided so that this disclosure will be thorough and complete, and will fully convey the scope of the disclosure to those skilled in the art. The drawings are merely schematic illustrations of the disclosure, and components in the drawings are not necessarily drawn to scale. The same reference numerals in the drawings denote the same or similar parts, and thus repeated descriptions thereof will be omitted.

Referring to FIG. 1, which illustrates a schematic diagram of a memory device 10 of an embodiment of the present disclosure. The memory device 10 includes a flash memory controller 100 and a flash memory 200. The flash memory controller 100 is configured to control an operation of the memory device 10 and access the flash memory 200, and the flash memory 200 is configured to store data. The memory device 10 may include, but is not limited to, solid state drives (SSDs) and various types of embedded memory devices such as embedded memory devices conforming to Peripheral Component Interconnect Express (PCIe) standard.

As shown in FIG. 1, the flash memory controller 100 may include an interface logic circuit 110, a control logic circuit 120, a microprocessor 130, a buffer 140, and a read-only memory 150. The flash memory controller 100 can communicate with a host device through the interface logic circuit 110. Moreover, the flash memory controller 100 is coupled to the flash memory 200 via the control logic circuit 120. The microprocessor 130 is electrically coupled to the interface logic circuit 110, the control logic circuit 120, the buffer 140, and the read-only memory 150. The buffer 140 can be implemented by a random access memory (RAM). For example, the buffer 140 may be a static random access memory (Static RAM, SRAM), but the present disclosure is not limited thereto. The read-only memory 150 is configured to store codes 151.

In some embodiments, the flash memory controller 100 executing the codes 151 through the microprocessor 130 can use its own internal components to perform many control operations, for example, to communicate with the host device by using the interface logic circuit 110, to control the access of the flash memory 200 by using the control logic circuit 120, to perform required buffer processing by using the buffer 140, and so on. For example, the microprocessor 130 receives program (write/read) commands from the host device through the interface logic circuit 110, and accesses data in the flash memory 200 through the control logic circuit 120. The control logic circuit 120 may include an encoder and a decoder. The encoder is configured to encode the data written into the flash memory 200 to generate a corresponding check code, and the decoder is configured to decode the data received from the flash memory 200.

In some embodiments, the host device may include a processor and a power supply circuit coupled to each other. The processor can be configured to control the operation of the host device. The power supply circuit can be configured to provide power to the processor and the memory device 10, and output one or more driving voltages to the memory device 10. The memory device 10 can provide storage space to the host device and acquire the one or more driving voltages from the host device as power for the memory device 10. The host device referred to herein may include, but are not limited to, mobile devices, wearable devices, tablet computers, and personal computers such as desktop computers and notebook computers.

In some embodiments, the interface logic circuit 110 of the flash memory controller 100 can conform to a specific communication standard, such as Serial Advanced Technology Attachment (Serial ATA or SATA) standard, Peripheral Component Interconnect (PCI) standard, PCIe standard, Universal Flash Storage (UFS) standard, etc., and can communicate according to the specific communication standard, for example, communicate between the host device and the memory device 10. The host device may include a corresponding transmission interface circuit conforming to the specific communication standard for communication between the host device and the memory device 10.

In this embodiment, the flash memory 200 may be a NAND flash. Correspondingly, the control logic circuit 120 of the flash memory controller 100 communicates with the flash memory 200 using a communication protocol compatible with an Open NAND Flash Interface (ONFI). For example, the flash memory controller 100 can convert requests from the host device into commands for the flash memory 200 according to the ONFI protocol, where the commands are selected from a command set defined in an ONFI specification.

As shown in FIG. 1, the flash memory 200 may include a plurality of flash memory chips, such as chips C1, C2, . . . CN, where N is a positive integer greater than 1. In this embodiment, it is taken that the flash memory 200 includes 12 chips as an example, but it is not limited thereto. Each chip C1-C12 of the flash memory 200 includes a plurality of blocks, and each block includes a plurality of pages. One page is usually the smallest unit of programming. In other words, one page is the smallest unit when writing or reading data. When accessing the data of one or more pages, the flash memory controller 100 will access the data of the one or more pages according to the preset access parameters, and perform a decoding operation on the data of the accessed pages.

In this embodiment, the host device can transmit host commands and corresponding logical addresses to the flash memory controller 100 to access the memory device 10. The flash memory controller 100 receives host commands and logical addresses, and converts the host commands into memory operation commands. The flash memory controller 100 further controls the flash memory 200 with the operation commands to perform operations, such as reading and/or writing (also known as programming), on memory units (such as data pages) of certain physical addresses in the flash memory 200. The physical addresses correspond to the logical addresses.

As shown in FIG. 1, the flash memory controller 100 accesses the flash memory 200 in parallel through multiple channels. In this embodiment, the control logic circuit 120 of the flash memory controller 100 includes four channels CH(0)-CH(3), and each channel is shared by four chips, but it is not limited thereto. The flash memory 200 includes a first chip-enable-signal controlled area 201, a second chip-enable-signal controlled area 202, a third chip-enable-signal controlled area 203, and a fourth chip-enable-signal controlled area 204. The control logic circuit 120 of the flash memory controller 100 is coupled to the first chip-enable-signal controlled area 201, the second chip-enable-signal controlled area 202, the third chip-enable-signal controlled area 203, and the fourth chip-enable-signal controlled area 204 of the flash memory 200 through the channels CH(0)-CH(3) to transmit data and commands. The processor 130 of the flash memory controller 100 transmits chip-enable signals CE(0)-CE(3) through the control logic circuit 120 to access the corresponding chip-enable-signal controlled area on the corresponding channel. Specifically, in this embodiment, the control logic circuit 120 uses several electronic signals to control the transmission of data and commands between the flash memory controller 100 and the flash memory 200, including data lines, clock signals, and control signals. The data lines can be configured to transmit commands, addresses, read and write data. The control signal line can be configured to transmit control signals, such as chip enable (CE), address latch enable (ALE), command latch enable (CLE), write enable (WE), and so on.

As shown in FIG. 1, the chip-enable signal CE(0) enables the chips C1-C3 on all channels CH(0)-CH(3) and disposed in the first chip-enable-signal controlled area 201. The chip-enable-signal CE(1) enables the chips C4-C6 on all channels CH(0)-CH(3) and disposed in the second chip-enable-signal controlled area 202. The chip-enable-signal CE(2) enables the chips C7-C9 on all channels CH(0)-CH(3) and disposed in the third chip-enable-signal controlled area 203. The chip-enable-signal CE(3) enables the chips C10-C12 on all channels CH(0)-CH(3) and disposed in the fourth chip-enable-signal controlled area 204. In this embodiment, the chip-enable signals CE(0), CE(1), CE(2), and CE(3) enables the chip-enable-signal controlled areas 201-204 in an interleaved way. The chip-enable-signal controlled areas 201-204 enabled by chip-enable-signals CE(0)-CE(3) are accessed in parallel through the plurality of channels CH(0)-CH(3).

It should be understood that the data quality of the blocks in the flash memory 200 will decrease as the temperature increases. In order to avoid unexpected errors or loss of data when executing read or write commands, an operating temperature of the flash memory 200 should be monitored to ensure that data access is performed when the temperature of the flash memory 200 is not higher than an allowable operating range. For example, the memory device 10 may be provided with a temperature sensor (not shown), but the present disclosure is not limited thereto. The temperature sensor can detect the temperature of the flash memory 200 at any time, and record a temperature value in its temporary register. When the flash memory controller 100 accesses the flash memory 200, the microcontroller 130 will command the flash memory 200 to send back the temperature value measured and recorded by the temperature sensor, so as to realize the temperature monitoring of the flash memory 200.

In this disclosure, one solution for acquiring the temperature of the flash memory 200 is to wait for a read operation of each channel to be completed before the flash memory controller 100 executes the temperature read operation. Moreover, the flash memory controller 100 will control the flash memory 200 to perform another read operation after waiting for the temperature information of each channel to be sent back. Specifically, refer to FIG. 2, which illustrates a timing diagram of read operations in an interleaved fashion at one channel among a flash memory according to a first embodiment of the present disclosure.

Figure 2:
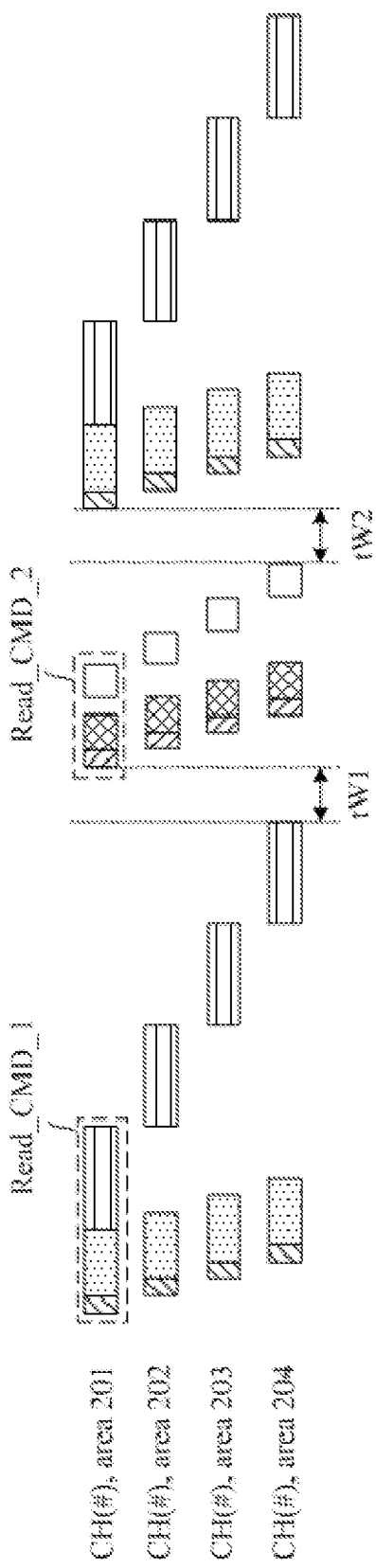
FIG. 2 illustrates a timing diagram of read operations in an interleaved fashion at one channel among a flash memory according to a first embodiment of the present disclosure.

In this embodiment, FIG. 2 illustrates the timing diagram showing the flash memory controller 100 performs the interleaved read operations on all chips in all chip-enable-signal controlled areas 201-204 at one channel CH(#). The flash memory controller 100 sequentially transmits a read command sequence to each chip-enable-signal controlled area 201-204. The read command sequence includes a first sub read command sequence Read_CMD_1 and a second sub read command sequence Read_CMD_2. In this embodiment, the first sub read command sequence Read_CMD_1 is configured to instruct the flash memory 200 to perform a read operation related to data, and the second sub read command sequence Read_CMD_2 is configured to instruct the flash memory 200 to perform a read operation related to temperature. It should be understood that different patterns (e.g., left slash, dot, horizontal line, right slash, grid, etc.) filled in blocks of the timing diagram represent different execution commands/states, and the blocks with the same pattern represent the same execution commands/states.

Figure 3A:
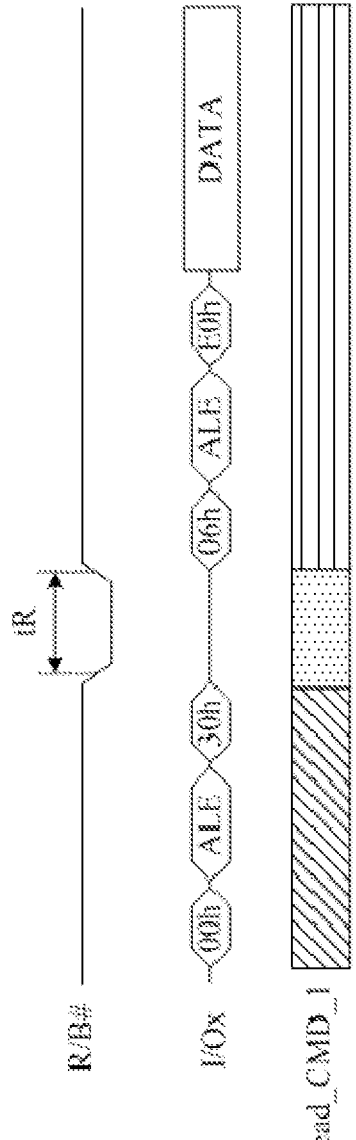
FIG. 3A illustrates a timing diagram for a first sub read command sequence.

Specifically, refer to FIG. 3A, which illustrates a timing diagram for the first sub read command sequence Read_CMD_1, in which I/Ox represents a data input/output signal of the flash memory controller 100 and the flash memory 200, and Ready/Busy # (R/B #) is configured to indicate that an operating status of the flash memory 200 is ready or busy. When ready/busy (R/B) signal is low, it means programming, erasing, or read operation is in progress, and when the R/B signal is high, it means the operation is complete. That is, a period when the R/B signal is at low potential indicates that the corresponding chip is preparing the data to be read by the flash memory controller 100, for example, finding the data according to the read address and storing it in the internal register of the chip, so its status is busy. On the other hand, a period labeled DATA in FIG. 3A represents that the flash memory controller 100 receives data from the corresponding chip through the channel.

As shown in FIG. 3A, the first sub read command sequence Read_CMD_1 is a normal read command sequence, including commands 00h, 30h, 06h, and E0h. Specifically, the flash memory controller 100 transmits the command "00h" to the flash memory 200. The command "00h" is configured to instruct the flash memory 200 to receive address information ALE, that is, an address receiving command. Then, the flash memory controller 100 transmits the address information ALE to the flash memory 200. Next, the flash memory controller 100 transmits the command "30h" to the flash memory 200. The command "30h" is configured to instruct the flash memory 200 to start a read operation based on the received command and address information. If the command "30h" is stored in a register of the chip, the read operation is started, and the status changes to the busy. In FIG. 3A, tR indicates a period during which the read operation is performed, and the chip is busy during this period.

As shown in FIG. 3A, in response to the end of the read operation, the flash memory controller 100 receives the data read by the flash memory 200. For example, the flash memory controller 100 determines the end of the read operation according to the R/B signal of the flash memory 200. Alternatively, the flash memory controller 100 can also issue a data transmission command and send it to the flash memory 200, and then the flash memory controller 100 receives the data DATA read by the flash memory 200. Specifically, first, the flash memory controller 100 transmits the command "06h" to the flash memory 200. The command "06h" is configured to instruct the flash memory 200 to receive address information ALE, that is, an address receiving command. Then, the flash memory controller 100 transmits the address information ALE corresponding to the transmission data to the flash memory 200. Next, the flash memory controller 100 transmits the command "E0h" to the flash memory 200. The command "E0h" is configured to instruct the flash memory 200 to output data to the flash memory controller 100 based on the previously transmitted address information ALE. According to the first sub read command sequence Read_CMD_1, the flash memory controller 100 can instruct the flash memory 200 to transmit data DATA.

As shown in FIG. 2 and FIG. 3A, at one channel, the flash memory controller 100 transmits the command sequence <00h-ALE-30h> of the first sub read command sequence Read CMD_1 to the areas 201-204 in sequence. In response to the end of the read operation of the area 201, the flash memory controller 100 transmits the command sequence <06h-ALE-E0h> of the first sub read command sequence Read_CMD_1 to the area 201. After waiting for the flash memory controller 100 to receive the data DATA from the area 201, the flash memory controller 100 transmits another command sequence <06h-ALE-E0h> to the area 202, and so on until receiving the data DATA of the last area 204. Furthermore, the flash memory controller 100 will not transmit the second sub read command sequence Read_CMD_2 until the execution of the first sub read command sequence Read_CMD_1 of all channels is completed. For example, in FIG. 2, tW1 represents the period of waiting for all channels to complete operations and to be in the ready status. It should be understood that when the flash memory controller 100 operates in a cache access mode, the command sequence adopted is <00h-ALE-31h>.

Figure 3B:
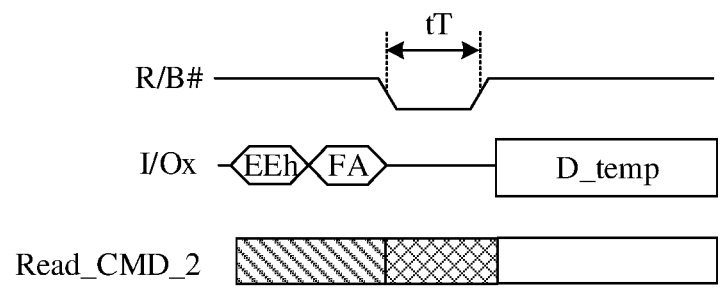
FIG. 3B illustrates a timing diagram for a second sub read command sequence.

Referring to FIG. 3B, which illustrates a timing diagram for the second sub read command sequence Read_CMD_2. The second sub read command sequence Read_CMD_2 includes commands EEh and FA. The flash memory controller 100 transmits the commands "EEh" and "FA" to the flash memory 200. The command "EEh" is a get feature command, and the command "FA" indicates an address associated with feature data. In this embodiment, the operating temperature information of the flash memory 200 is read as the feature data. In FIG. 3B, tT represents a period during which the temperature of the flash memory 200 is measured, and the chip is busy during this period. Then, the flash memory controller 100 detects the completion of the operation temperature measurement according to the R/B signal of the flash memory 200, and the flash memory controller 100 starts to receive the operating temperature information from the flash memory 200. For example, the period labeled D_temp in FIG. 3B represents that the flash memory controller 100 receives the operating temperature information from the corresponding chip through the channel.

Figure 3C:
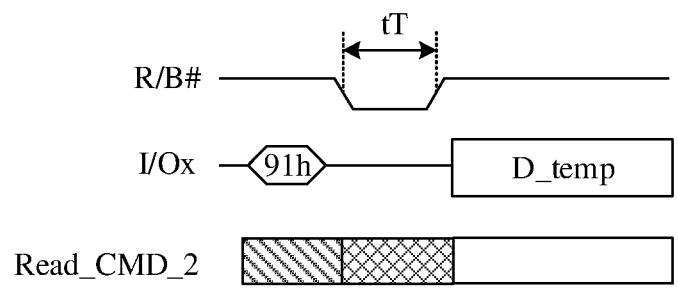
FIG. 3C illustrates another timing diagram for a second sub read command sequence.

In some embodiments, the second sub read command sequence Read_CMD_2 may use different commands to acquire the operating temperature. For example, refer to FIG. 3C, which illustrates another timing diagram for the second sub read command sequence Read_CMD_2. In this embodiment, the second sub read command sequence Read_CMD_2 includes a command 91h. The flash memory controller 100 transmits the command "91h" to the flash memory 200. Then, the flash memory controller 100 detects the completion of the operation temperature measurement according to the R/B signal of the flash memory 200, and the flash memory controller 100 starts to receive the operating temperature information from the flash memory 200.

As shown in FIG. 2 and FIG. 3A, at one channel, the flash memory controller 100 transmits the commands "EEh" and "FA" or the command "91h" of the second sub read command sequenceRead_CMD_2 to the areas 201-204 in sequence. Then, after the transmission of the commands "EEh" and "FA" or the command "91h" to the last area 204 is completed, the flash memory controller 100 starts to receive the operating temperature information D_temp from the areas 201-204 in sequence until the flash memory controller 100 receives the operating temperature information D_temp from the last area 204. Furthermore, the flash memory controller 100 can perform another read operation on the flash memory 200 after waiting for the execution of the second sub read command sequence Read_CMD_2 of all channels to be completed. For example, in FIG. 2, tW2 represents the period of waiting for all channels to complete operations and to be in the ready status.

In the present disclosure, the temperature monitoring of the flash memory 200 is realized through the interleaved read operations of the flash memory in the first embodiment. However, as shown in FIG. 2, the flash memory controller 100 can transmit the second sub read command sequence Read_CMD_2 to read the temperature after waiting for all channels to complete operations and the flash memory 200 to be in the ready status (the period tW1). Also, the flash memory controller 100 can perform another read operation on the flash memory 200 only after the execution of the second sub read command sequence Read_CMD_2 of all channels is completed (the period tW2). Therefore, in this embodiment, the temperature read operation needs to spend a certain amount of time waiting for the flash memory 200 to be in the ready status. On the other hand, when the flash memory controller 100 operates in the cache access mode, if the second sub read command sequence Read_CMD_2 including the command "91h" is used to acquire the operating temperature, this method will disrupt the data on the register of the flash memory 200, resulting in interruption of the cache read operation. In view of this, the present disclosure also proposes another solution to make the flash memory that performs the read operation quickly return the operating temperature information without affecting the execution of the normal read operation.

Referring to FIG. 4, which illustrates a timing diagram of read operations in an interleaved fashion at one channel among a flash memory according to a second embodiment of the present disclosure. Specifically, FIG. 4 illustrates the timing diagram showing the flash memory controller 100 performs the interleaved read operations on all chips in all chip-enable-signal controlled areas 201-204 at one channel CH(#). The processor 130 of the flash memory controller 100 controls the control logic circuit 120 to transmit a read command sequence to the chip-enable-signal controlled areas 201-204 through the channel. The read command sequence includes a first sub read command sequence CMD_1 and a second sub read command sequence CMD_2. The first sub read command sequence CMD_1 is executed before the second sub read command sequence CMD_2. The first sub read command sequence CMD_1 includes a first command, which is configured to instruct the corresponding chip-enable-signal controlled area to read stored data DATA and read operating temperature information D_temp. The second sub read command sequence CMD_2 includes a second command. In response to the transmission of the second command, the processor 130 of the flash memory controller 100 controls the control logic circuit 120 to receive at least one of the stored data DATA and the operating temperature information D_temp from the corresponding chip-enable-signal controlled area. It should be understood that different patterns (e.g., left slash, dot, horizontal line, right slash, grid, etc.) filled in blocks of the timing diagram represent different execution commands/states, and blocks with the same pattern represent the same or similar execution commands/states.

Specifically, referring to FIG. 5, which illustrates a timing diagram for a read command sequence according to the second embodiment of the present disclosure, in which I/Ox represents a data input/output signal of the flash memory controller 100 and the flash memory 200, and R/B # is configured to indicate that an operating status of the flash memory 200 is ready or busy. When ready/busy (R/B) signal is low, it means programming, erasing, or read operation is in progress, and when the R/B signal is high, it means the operation is complete. That is, a period when the R/B signal is at low potential indicates that the corresponding chip is preparing the data to be read by the flash memory controller 100, for example, finding the data according to the read address and storing it in the internal register of the chip, so its status is busy. On the other hand, a period labeled DATA in FIG. 5 represents that the flash memory controller 100 receives data from the corresponding chip through the channel, and a period labeled D_temp represents that the flash memory controller 100 receives operating temperature information of the corresponding chip through the channel.

As shown in FIG. 5, the first sub read command sequence CMD_1 of the read command sequence includes commands 00h and 14h, where the command "14h" serves as the first command. It should be noted that the command "14h" is optional, for example, it can be replaced by any command in the command set defined in the ONFI specification. The flash memory controller 100 transmits the command "00h" to the flash memory 200. The command "00h" is configured to instruct the flash memory 200 to receive address information ALE, that is, an address receiving command. The command "00h" transmitted through the channel is stored in a command register of the corresponding chip of the flash memory 200. Next, the flash memory controller 100 transmits the address information ALE to the flash memory 200. The address information ALE transmitted via the channel is stored in an address register of the corresponding chip of the flash memory 200. Next, the flash memory controller 100 transmits the command "14h" to the flash memory 200. The command "14h" is configured to instruct the flash memory 200 to start the read operation based on the received command and address information and to start measuring the operating temperature. The command "14h" transmitted through the channel is stored in the command register of the corresponding chip of the flash memory 200. If the command "14h" is stored in the register of the chip, then the read and measurement operations are started, and the status changes to busy. In FIG. 5, tR represents the period during which the operation of reading stored data is performed, and tT represents the period during which the operation temperature information of the flash memory 200 is measured. In this embodiment, the reading of the stored data is adjacent to the reading of the operating temperature information in time sequence.

In some embodiments, specific commands for enabling the operation of measuring temperature, such as (but not limited to) AAh, may be inserted at different positions in the read command sequence. The command "AAh" is optional, for example, it can be replaced by any command in the command set defined in the ONFI specification. For example, in some embodiments, the first sub read command sequence CMD_1 includes commands 00h, AAh, and 30h. In a first example, the first sub read command sequence CMD_1 includes a command sequence <AAh-00h-ALE-30h> in which the command "AAh" is inserted and transmitted before the command "00h". In a second example, the first sub read command sequence CMD_1 includes a command sequence <00h-AAh-ALE-30h> in which the command "AAh" is inserted and transmitted between the command "00h" and address information. In a third example, the first sub read command sequence CMD_1 includes a command sequence <00h-ALE-AAh-30h> in which the command "AAh" is inserted and transmitted between the address information and the command "30h". In a fourth example, the first sub read command sequence CMD_1 includes a command sequence <00h-ALE-30h-AAh> in which the command "AAh" is inserted and transmitted after the command "30h". In other embodiments, the command "AAh" can be inserted and transmitted between the address information (such as between a logical column address and a logical row address), or it may be transmitted between any two valid data portions. It should be understood that, in the foregoing first to fourth examples, the commands "AAh" and "30h" together serve as the first command of the read command sequence in this embodiment.

As shown in FIG. 5, the second sub read command sequence CMD_2 of the read command sequence includes, for example, commands 06h and E0h, where the command "E0h" serves as the second command. The flash memory controller 100 detects the end of the read operation and the temperature measurement operation according to the R/B signal of the flash memory 200. Specifically, first, the flash memory controller 100 transmits the command "06h" to the flash memory 200. The command "06h" is configured to instruct the flash memory 200 to receive the address information ALE, that is, an address receiving command. Then, the flash memory controller 100 transmits the address information ALE corresponding to the transmission data to the flash memory 200. Next, the flash memory controller 100 transmits the command "E0h" to the flash memory 200. The command "E0h" is configured to instruct the flash memory 200 to output at least one of the stored data DATA and the operating temperature information D_temp to the flash memory controller 100 based on the previously transmitted address information ALE.

It should be noted that when the flash memory 200 is read, the location of the page to be read needs to be specified, and this location can be composed of a logical column address and a logical row address. For the command to obtain the temperature of the flash memory 200, the position of the byte in the page to be read needs to be specified through the logical column address. According to the specification, the logical column address must specify the maximum number of bytes in the page to be read, so as to ensure that the flash memory 200 can correctly return the operating temperature information D_temp. That is, if the logical column address does not specify the maximum number of bytes in the page to be read, the flash memory 200 may not be able to identify which byte is to be read, and thus the flash memory 200 may not be able to correctly return the operating temperature information. If the logical column address in ALE is a normal number of bytes, the flash memory 200 will return the data in the page corresponding to the address. If the logical column address is the maximum number of bytes, the flash memory 200 will return its operating temperature information D_temp.

That is, in this embodiment, in response to the transmission of the second command, the flash memory controller 100 determines to receive the stored data DATA or the operating temperature information D_temp according to one address receiving command corresponding to the second command. Specifically, after the flash memory controller 100 transmits the command "E0h" to the flash memory 200, the flash memory 200 will return the stored data DATA or the operating temperature information D_temp. Also, whether the flash memory 200 should return the read stored data DATA or the measured operating temperature information D_temp is determined according to the content of the address information ALE. The smallest writing unit in the flash memory 200 is a page. When the address indicated by the address information ALE can correspond to the address in any page in the flash memory 200 (that is, in the addressable space of the flash memory 200), then the flash memory 200 will return the read stored data DATA to the flash memory controller 100. On the other hand, when the address indicated by the address information ALE cannot correspond to the address in any page in the flash memory 200 (that is, outside the addressable space of the flash memory 200), the flash memory 200 will return the operating temperature information D_temp to the flash memory controller 100.

Alternatively, in some embodiments, the read command sequence includes two second sub read command sequences CMD_2. That is, the flash memory controller 100 will send the second sub read command sequence CMD_2 to the flash memory 200 twice. When the command sequence <06h-ALE-E0h> is transmitted for the first time, the flash memory 200 is instructed to return the read stored data DATA. Moreover, after receiving the stored data DATA, the flash memory controller 100 sends the command sequence <06h-ALE-E0h> again, and the flash memory 200 returns the operating temperature information D_temp. With this design, the flash memory controller 100 can receive the stored data DATA read from the flash memory 200 and the measured operating temperature information D_temp.

Figure 6:
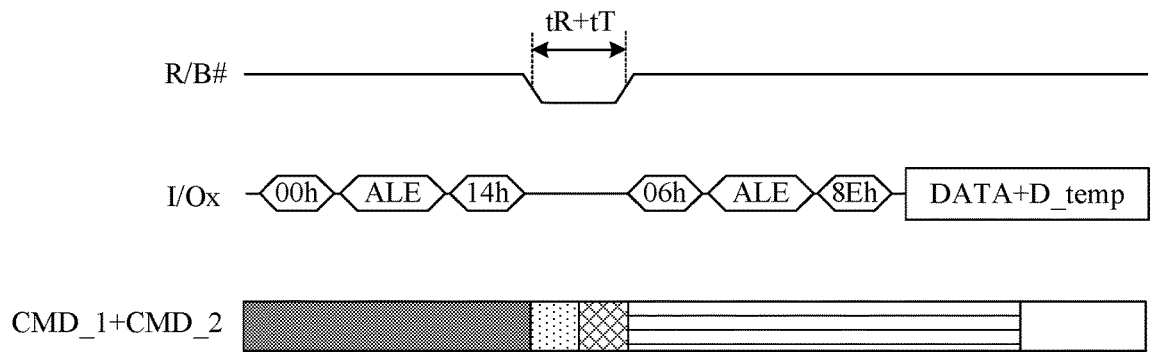
FIG. 6 illustrates another timing diagram for a read command sequence according to the second embodiment of the present disclosure.

Referring to FIG. 6, which illustrates another timing diagram for a read command sequence according to the second embodiment of the present disclosure. The timing diagram of FIG. 6 is substantially the same as that of FIG. 5, except that in FIG. 6, the second sub read command sequence CMD_2 of the read command sequence includes, for example, commands 06h and 8Eh, and the command "8Eh" serves as the second command. It should be noted that the command "8Eh" is optional, for example, it can be replaced by any command in the command set defined in the ONFI specification. The command "8Eh" is configured to instruct the flash memory 200 to output both the stored data DATA and the operating temperature information D_temp to the flash memory controller 100 based on the previously transmitted address information ALE. Specifically, after the flash memory controller 100 transmits the command sequence <06h-ALE-8Eh>, the flash memory 200 will successively return the read stored data DATA and the measured operating temperature information D_temp.

As shown in FIG. 4, for the first chip-enable-signal controlled area 201, the first sub read command sequence CMD_1 of the read command sequence is transmitted immediately after the previous normal read command (i.e., the command is only used to instruct to read the data stored in the flash memory 200 without reading the temperature information). Specifically, after acquiring the data read by the first chip-enable-signal controlled area 201 based on a previous read operation via the channel, the flash memory controller 100 transmits the first sub read command sequence CMD_1 of the read command sequence to the first chip-enable-signal controlled area 201 via the channel. After the processor 130 of the flash memory controller 100 controls the control logic circuit 120 to transmit the first command "14h" of the first sub read command sequence CMD_1 to the first chip-enable-signal controlled area 201 via the channel and before the flash memory controller 100 transmits the second command "E0h" or "8Eh" of the second sub read command sequence CMD_2 to the first chip-enable-signal controlled area 201, the processor 130 of the flash memory controller 100 controls the control logic circuit 120 to transmit the first command "14h" of another first sub read command sequence to another chip-enable-signal controlled area via the channel. Specifically, after the first sub read command sequence CMD_1 is transmitted to the first chip-enable-signal controlled area 201, the data read by the second chip-enable-signal controlled area 202 based on the previous read operation is acquired via this channel. Then, the flash memory controller 100 transmits another first sub read command sequence CMD_1 to the second chip-enable-signal controlled area 202 via the channel. By that analogy, after the flash memory controller 100 transmits another first sub read command sequence CMD_1 to the last chip-enable-signal controlled area (the fourth chip-enable-signal controlled area 204) via the channel, the flash memory controller 100 transmits the second sub read command sequence CMD_2 of the read command sequence to the first chip-enable-signal controlled area 201. That is, the transmission of the first command "14h" of the first sub read command sequence CMD_1 to the fourth chip-enable-signal controlled area 204 is adjacent to the transmission of the address receiving command "06h" corresponding to the second command "E0h" or "8Eh" of the second sub read command sequence CMD_2 to the first chip-enable-signal controlled area 201 in time sequence.

In this embodiment, after the processor 130 of the flash memory controller 100 controls the control logic circuit 120 to receive the operating temperature information D_temp from the corresponding chip-enable-signal controlled area (such as the first chip-enable-signal controlled area 201), the processor 130 controls the control logic circuit 120 to transmit the address receiving command (e.g., 00h) corresponding to the data read command (e.g., 30h) via the channel. In some embodiments, the processor 130 can also control the control logic circuit 120 to immediately transmit an address receiving command (e.g., 00h) corresponding to another first command (e.g., 14h) to the chip-enable-signal controlled area via the channel.

In the second embodiment of the present disclosure, at least one of the stored data DATA and the operating temperature information D_temp can be acquired by executing the read command sequence. Moreover, the read command sequence is transmitted immediately after the previous normal read command, avoiding time-consuming waiting for the end of all channel operations (that is, waiting for the flash memory 200 to be in the ready status).

In the present disclosure, the read command sequence of the second embodiment is also applicable to a multi-plane read operation of the flash memory 200. It can be understood that the known command sequence of the multi-plane read operation is <00h-ALE-32h-00h-ALE-30h>, where the command "32h" is configured to indicate the execution of the multi-plane operation. In this embodiment, the command "30" is replaced by the command "14h", that is, the command sequence of the multi-plane read operation in this embodiment is <00h-ALE-32h-00h-ALE-14h>. If the command "14h" is stored in the register corresponding to the chip of the flash memory 200, the multi-plane read operation then begins based on the command including the indication and the command "32h" with respect to the first plane, and the command including the indication and the command "30" with respect to the second plane. Specifically, at least one of the stored data DATA and the operating temperature information D_temp is received in the manner of the above-mentioned second sub read command sequence CMD_2.

On the other hand, the following will describe how to acquire the operating temperature information of the flash memory 200 when the flash memory controller 100 operates in a cache access mode.

Figure 7:
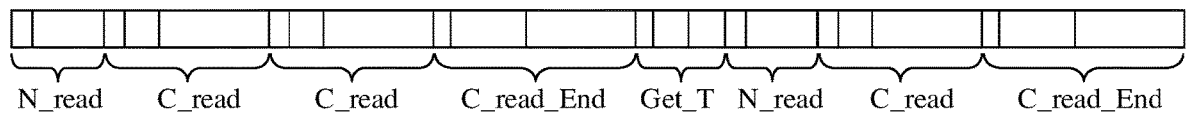
FIG. 7 illustrates a timing diagram of a read operation according to a third embodiment of the present disclosure.

Referring to FIG. 7, which illustrates a timing diagram of a read operation according to a third embodiment of the present disclosure, where the flash memory controller 100 operates in a cache access mode. In FIG. 7, the operation sequence of the flash memory controller 100 accessing a single chip-enable-signal controlled area through a single channel is illustrated. The flash memory controller 100 transmits various read command sequences to instruct the flash memory 200 to perform corresponding read operations. The various read command sequences include a normal read command sequence N_read, a cache read command sequence C_read, a cache read end command sequence C_read_End, and a get temperature command sequence Get_T.

Figure 8A:
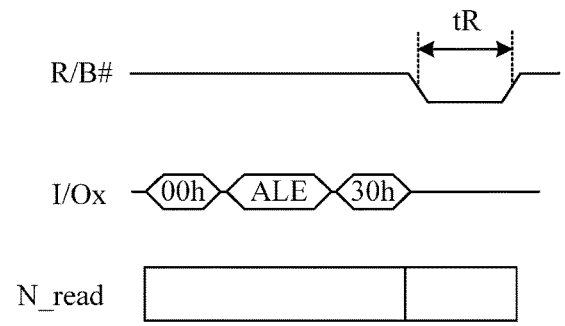
FIG. 8A illustrates a timing diagram for a command sequence N_read.

As shown in FIG. 7, first, the flash memory controller 100 transmits the normal read command sequence N_read to the flash memory 200. In this embodiment, the normal read command sequence N_read is configured to instruct the flash memory 200 to perform a normal read operation (that is, only to read data stored in the flash memory 200 without reading temperature information). As shown in FIG. 8A, the normal read command sequence N_read is the same as part of the command sequence <00h-ALE-30h> of the first sub read command sequence Read_CMD_1 illustrated in FIG. 3A in the first embodiment, and details are not repeated here.

Figure 8B:
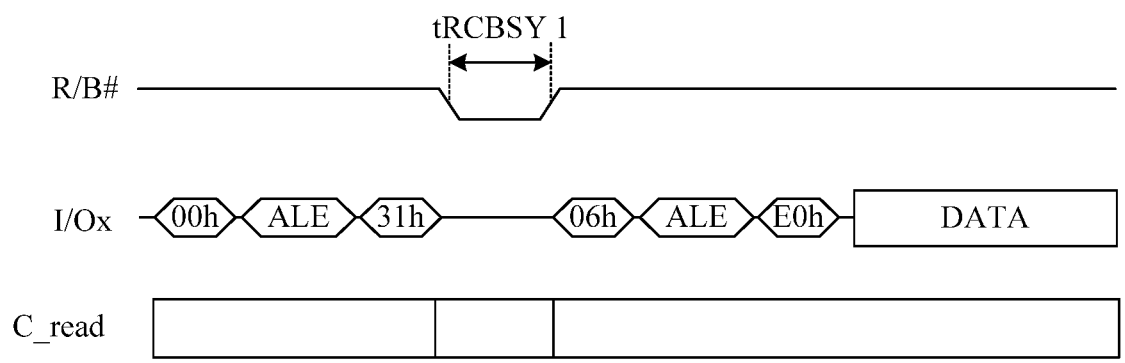
FIG. 8B illustrates a timing diagram for a command sequence C_read.

As shown in FIG. 7, then, the flash memory controller 100 transmits the cache read command sequence C_read to the flash memory 200. As shown in FIG. 8B, the cache read command sequence C_read includes commands 00h, 31h, 06h, and E0h. The command "31h" is configured to indicate the execution of the cache read operation, and the flash memory 200 receiving this command executes the corresponding read operation. In FIG. 8B, "tRCBSY 1" indicates the period during which the operation of reading stored data is performed. When the read operation ends, as described in the first embodiment and the second embodiment, after determining the end of the read operation, the corresponding read data is output. As shown in FIG. 7, the flash memory controller 100 continues to transmit the cache read command sequence C_read to the flash memory 200, and the flash memory 200 receiving these commands executes corresponding read operations. Likewise, when the read operation ends, the corresponding read data is output.

Figure 8C:
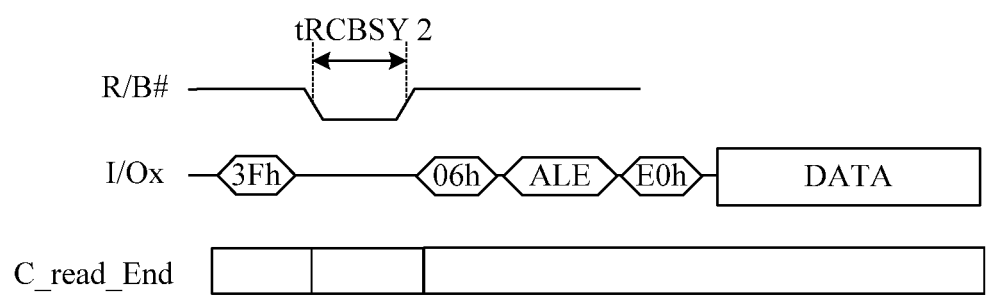
FIG. 8C illustrates a timing diagram for a command sequence C_read_End.

As shown in FIG. 7, in the case of ending the cache read operation, a different cache read end command sequence C_read_End is used for instructing the cache read operation relative to the last specified page. Specifically, as shown in FIG. 8C, at the end of the cache read operation, the command "3Fh" is used instead of the command "31h". The command "3Fh" is the last command representing the cache read operation. In FIG. 8C, "tRCBSY 2" indicates the period during which the operating temperature information of the flash memory 200 is measured. The flash memory 200 reads the data of the next page based on the command "3Fh", outputs the data, and ends the read operation.

As shown in FIG. 7, the temperature read operation can only be performed after the cache read operation is completed. Specifically, waiting for the chip to finish its operation and to be in the ready status, the flash memory controller 100 transmits the get temperature command sequence Get_T to the flash memory 200. The get temperature command sequence Get_T in this embodiment is the same as the second sub read command sequence Read_CMD_2 illustrated in FIG. 3B or FIG. 3C in the first embodiment, and will not be repeated here.

In the present disclosure, the temperature monitoring of the flash memory 200 is realized through the read operation of the third embodiment. However, as shown in FIG. 7, the flash memory 200 will read specific bytes when reading the temperature. The data of these bytes may overwrite some bytes, thereby polluting the data in the cache. Therefore, in order to prevent the data in the cache from being polluted, it is necessary to complete the cache read operation and then read the required data from the cache. Thus, the temperature read operation can be performed. That is, the flash memory controller 100 can transmit the get temperature command sequence Get_T to read the temperature after the cache read operation has to be completed and the flash memory 200 to be in the ready status. After reading the temperature, if it is necessary to continue the cache read operation, the command and address need to be resent to clear the previous polluted data, and then start a new cache read operation. In this way, unnecessary time consumption is caused. In view of this, the present disclosure also proposes another solution to enable the flash memory performing the cache read operation to quickly return the operating temperature information without affecting the execution of the cache read operation.

Figure 9:
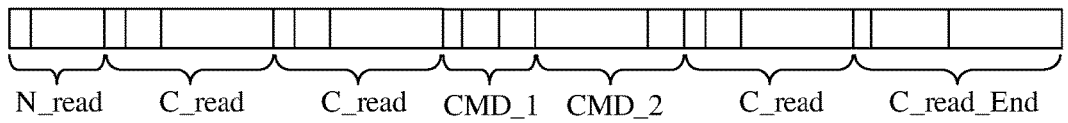
FIG. 9 illustrates a timing diagram of a read operation according to a fourth embodiment of the present disclosure.

Referring to FIG. 9, which illustrates a timing diagram of a read operation according to a fourth embodiment of the present disclosure, where the flash memory controller 100 operates in the cache access mode. In FIG. 9, the operation sequence of the flash memory controller 100 accessing a single chip-enable-signal controlled area through a single channel is illustrated. The flash memory controller 100 transmits various read command sequences to instruct the flash memory 200 to perform corresponding read operations. The various read command sequences include a normal read command sequence N_read, a cache read command sequence C_read, a cache read end command sequence C_read_End, and a read command sequence, where the read command sequence includes a first sub read command sequence CMD_1 and a second sub read command sequence CMD_2.

As shown in FIG. 9, first, the flash memory controller 100 transmits a normal read command sequence N_read to instruct the flash memory 200 to perform a normal read operation (that is, only to read data stored in the flash memory 200 without reading temperature information). The normal read command sequence N_read of this embodiment is the same as the normal read command sequence N_read shown in FIG. 8A above. That is, it is the same as part of the command sequence <00h-ALE-30h> of the first sub read command sequence Read_CMD_1 as illustrated in FIG. 3A in the first embodiment, and details are not repeated here.

As shown in FIG. 9, the flash memory controller 100 then transmits the cache read command sequence C_read to the flash memory 200. The cached read command sequence C_read in this embodiment is the same as the cached read command sequence C_read shown in FIG. 8B above, that is, includes commands 00h, 31h, 06h, and E0h. The command "31h" is configured to indicate the execution of the cache read operation, and the flash memory 200 receiving the command executes the corresponding read operation. When the read operation ends, as described in the first embodiment and the second embodiment, after determining the end of the read operation, the corresponding read data is output. As shown in FIG. 9, the flash memory controller 100 continues to transmit the cache read command sequence C_read to the flash memory 200, and the flash memory 200 receiving these commands executes the corresponding read operation. Likewise, when the read operation ends, the corresponding read data is output.

As shown in FIG. 9, the processor 130 of the flash memory controller 100 then controls the control logic circuit 120 to transmit the read command sequence to the corresponding chip-enable-signal controlled area (such as the first chip-enable-signal controlled area 201) via the channel. The read command sequence includes the first sub read command sequence CMD_1 and the second sub read command sequence CMD_2. The first sub read command CMD 1 is transmitted and executed before the second sub read command sequence CMD_2. The first sub read command sequence CMD_1 includes the first command, which is configured to instruct the corresponding chip-enable-signal controlled area to read stored data and read operating temperature information. The second sub read command sequence CMD_2 includes the second command. In response to the transmission of the second command, the processor 130 of the flash memory controller 100 controls the control logic circuit 120 to receive at least one of stored data DATA and operating temperature information from the corresponding chip-enable-signal controlled area.

Figure 10:
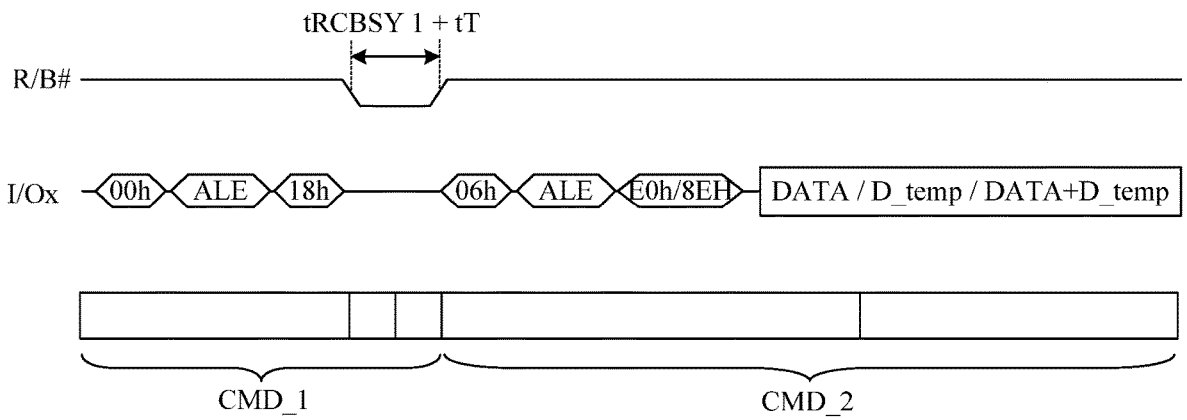
FIG. 10 illustrates a timing diagram for a read command sequence according to the fourth embodiment of the present disclosure.

Referring to FIG. 10, which illustrates a timing diagram for a read command sequence according to the fourth embodiment of the present disclosure. The first sub read command sequence CMD_1 is <00h-ALE-18h>, where the command "18h" serves as the first command. It should be noted that the command "18h" is optional, for example, can be replaced by any command in the command set defined in the ONFI specification. The command "18h" of the first sub read command sequence CMD_1 is configured to instruct the flash memory 200 to perform the cache read operation and to start measuring the operation temperature. The command "18h" transmitted via the channel is stored in the command register of the corresponding chip of the flash memory 200. If the command "18h" is stored in the register of the chip, then the data reading and temperature measurement operations are started, and the status changes to busy. In FIG. 10, "tRCBSY 1" represents the period during which the operation of reading stored data is performed, and tT represents the period during which the temperature of the flash memory 200 is measured. In this embodiment, the reading of stored data is adjacent to the measurement of operating temperature information in time sequence.

In some embodiments, specific commands for enabling the operation of measuring temperature, such as (but not limited to) AAh, may be inserted at different positions in the read command sequence. The command "AAh" is optional, for example, it can be replaced by any command in the command set defined in the ONFI specification. For example, in some embodiments, the first sub read command sequence CMD_1 includes commands 00h, AAh, and 31h. In a first example, the first sub read command sequence CMD_1 includes a command sequence <AAh-00h-ALE-31h> in which the command "AAh" is inserted and transmitted before the command "00h". In a second example, the first sub read command sequence CMD_1 includes a command sequence <00h-AAh-ALE-31h> in which the command "AAh" is inserted and transmitted between the command "00h" and the address information. In a third example, the first sub read command sequence CMD_1 includes a command sequence <00h-ALE-AAh-31h> in which the command "AAh" is inserted and transmitted between the address information and the command "31h". In a fourth example, the first sub read command sequence CMD_1 includes a command sequence <00h-ALE-31h-AAh> in which the command "AAh" is inserted and transmitted after the command "31h". In other embodiments, the command "AAh" can be inserted and transmitted between the address information (such as between a logical column address and a logical row address), or it may be transmitted between any two valid data portions. It should be understood that, in the foregoing first to fourth examples, the commands "AAh" and "31h" together serve as the first command of the read command sequence in this embodiment.

On the other hand, the second sub read command sequence CMD_2 of this embodiment is the same as the second sub read command sequence CMD_2 illustrated in FIG. 5 or FIG. 6 in the second embodiment (i.e., <06h-ALE-E0h> or <06h-ALE-8Eh>), which will not be described here.

In some embodiments, there is no command instructing the corresponding chip-enable-signal controlled area to read another operating temperature information in another read command sequence transmitted before or after the read command sequence.

In the fourth embodiment of the present disclosure, at least one of the stored data and the operating temperature information can be acquired by executing the read command sequence. Moreover, the read command sequence is transmitted immediately after the previous cache read command, which prevents the need to end the cache read operation first and cause time consumption.

The present disclosure also provides a data reading method executed by a flash memory controller coupled to a flash memory. The flash memory controller and flash memory are described above and will not be described in detail here. The flash memory controller is coupled to the first chip-enable-signal controlled area of the flash memory through at least one channel to transmit data and commands. Specifically, the microprocessor of the flash memory controller is usually configured to control the overall operation of the memory device. The microprocessor executes the code and then executes all or part of the steps in the data reading method of the first embodiment to the fourth embodiment above.

Figure 11:
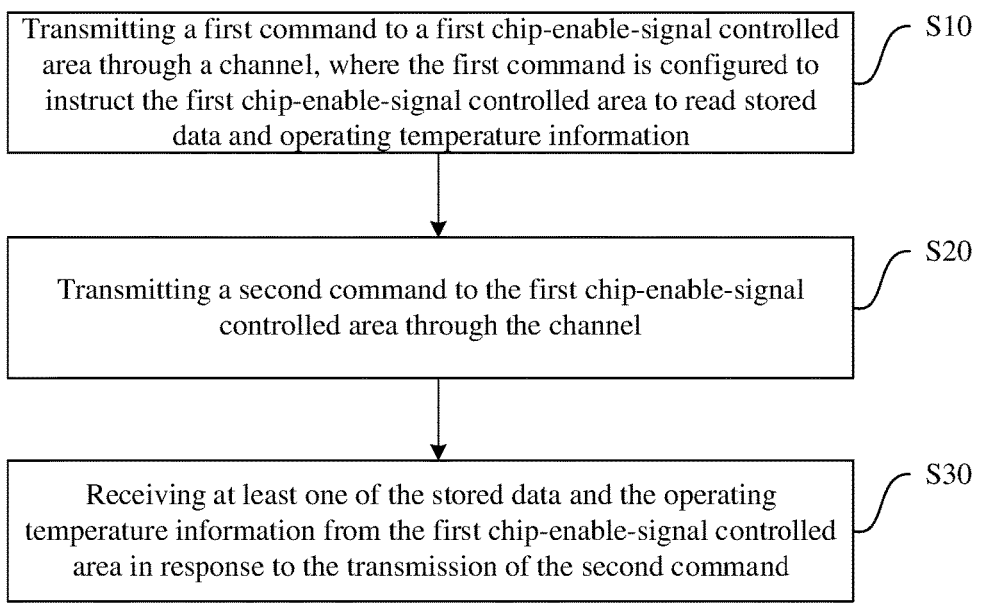
FIG. 11 illustrates a flowchart of a data reading method of the present disclosure.

Referring to FIG. 11, which illustrates a flowchart of a data reading method of the present disclosure. The data reading method includes at least step S10 to step S30. In the step S10, a first command is transmitted to the first chip-enable-signal controlled area through the channel, where the first command is configured to instruct the first chip-enable-signal controlled area to read stored data and operating temperature information. In the step S20, a second command is transmitted to the first chip-enable-signal controlled area through the channel. In the step S30, at least one of the stored data and the operating temperature information is received from the first chip-enable-signal controlled area in response to the transmission of the second command.

In some embodiments, the receiving of the stored data is adjacent to the receiving of the operating temperature information in time sequence.

In some embodiments, the first command is transmitted before the second command.

In some embodiments, the flash memory further includes a second chip-enable-signal controlled area. After the flash memory controller transmits the first command to the first chip-enable-signal controlled area through the channel and before the second command is transmitted to the first chip-enable-signal controlled area, the data reading method further includes a step of transmitting another first command to the second chip-enable-signal controlled area through the channel.

In some embodiments, the transmission of the another first command is adjacent to a transmission of an address receiving command corresponding to the second command in time sequence.

In some embodiments, after the flash memory controller receives at least one of the stored data and the operating temperature information from the first chip-enable-signal controlled area, the data reading method further includes a step of transmitting an address receiving command corresponding to a data read command or an address receiving command corresponding to another first command to the first chip-enable-signal controlled area through the channel.

In some embodiments, the flash memory controller operates in a cache access mode.

In some embodiments, the first command and the second command together form a read command sequence, and there is no command instructing the first chip-enable-signal controlled area to read another operating temperature information in another read command sequence transmitted before or after the read command sequence.

In some embodiments, in response to the transmission of the second command, the flash memory controller determines to receive the stored data or the operating temperature information according to an address receiving command corresponding to the second command.

In some embodiments, the first command and the second command are selected from a command set defined in an Open NAND Flash Interface (ONFI) specification.

The above are only specific implementations of the present disclosure, but the protection scope of the present disclosure is not limited thereto. Any changes or replacements that can be easily devised by those skilled in the art within the technical scope of the present disclosure should all fall within the protection scope of the present disclosure. Therefore, the protection scope of the present disclosure should be defined by the protection scope of appending claims.

What is claimed is:

1. A flash memory controller for controlling a flash memory, wherein the flash memory comprises a first chip-enable-signal controlled area, the flash memory controller comprises:
    a control logic circuit coupled to the first chip-enable-signal controlled area of the flash memory through at least one channel to transmit data and commands; and
    a processor coupled to the control logic circuit to access the first chip-enable-signal controlled area on the channel through the control logic circuit, wherein the processor controls the control logic circuit to transmit a read command sequence to the first chip-enable-signal controlled area through the channel; and
    wherein the read command sequence comprises a first command and a second command, the first command is configured to instruct the first chip-enable-signal controlled area to read stored data and read operating temperature information, and in response to the transmission of the second command, the processor controls the control logic circuit to receive at least one of the stored data and the operating temperature information from the first chip-enable-signal controlled area.

2. The flash memory controller according to claim 1, wherein the receiving of the stored data is adjacent to the receiving of the operating temperature information in time sequence.

3. The flash memory controller according to claim 1, wherein the first command is transmitted before the second command.

4. The flash memory controller according to claim 1, wherein the flash memory further comprises a second chip-enable-signal controlled area; and
the processor controls the control logic circuit to transmit another first command to the second chip-enable-signal controlled area through the channel after the processor controls the control logic circuit to transmit the first command to the first chip-enable-signal controlled area through the channel and before the second command is transmitted to the first chip-enable-signal controlled area.

5. The flash memory controller according to claim 4, wherein the transmission of the another first command is adjacent to a transmission of an address receiving command corresponding to the second command in time sequence.

6. The flash memory controller according to claim 1, wherein the processor controls the control logic circuit to transmit an address receiving command corresponding to a data read command or an address receiving command corresponding to another first command to the first chip-enable-signal controlled area through the channel after the processor controls the control logic circuit to receive the operating temperature information from the first chip-enable-signal controlled area.

7. The flash memory controller according to claim 1, wherein the flash memory controller operates in a cache access mode.

8. The flash memory controller according to claim 1, wherein there is no command instructing the first chip-enable-signal controlled area to read another operating temperature information in another read command sequence transmitted before or after the read command sequence.

9. The flash memory controller according to claim 1, wherein in response to the transmission of the second command, the processor determines to receive the stored data or the operating temperature information according to an address receiving command corresponding to the second command.

10. The flash memory controller according to claim 1, wherein the first command and the second command are selected from a command set defined in an Open NAND Flash Interface (ONFI) specification.

11. A data reading method executed by a flash memory controller coupled to a flash memory, wherein the flash memory comprises a first chip-enable-signal controlled area, the flash memory controller is coupled to the first chip-enable-signal controlled area of the flash memory through at least one channel to transmit data and commands, and the data reading method comprises:
transmitting a first command to the first chip-enable-signal controlled area through the channel, wherein the first command is configured to instruct the first chip-enable-signal controlled area to read stored data and operating temperature information;
transmitting a second command to the first chip-enable-signal controlled area through the channel; and
receiving at least one of the stored data and the operating temperature information from the first chip-enable-signal controlled area in response to the transmission of the second command.

12. The data reading method according to claim 11, wherein the receiving of the stored data is adjacent to the receiving of the operating temperature information in time sequence.

13. The data reading method according to claim 11, wherein the first command is transmitted before the second command.

14. The data reading method according to claim 11, wherein the flash memory further comprises a second chip-enable-signal controlled area; and after the flash memory controller transmits the first command to the first chip-enable-signal controlled area through the channel and before the second command is transmitted to the first chip-enable-signal controlled area, the data reading method further comprises:
transmitting another first command to the second chip-enable-signal controlled area through the channel.

15. The data reading method according to claim 14, wherein the transmission of the another first command is adjacent to a transmission of an address receiving command corresponding to the second command in time sequence.

16. The data reading method according to claim 11, wherein after the flash memory controller receives at least one of the stored data and the operating temperature information from the first chip-enable-signal controlled area, the data reading method further comprises:
transmitting an address receiving command corresponding to a data read command or an address receiving command corresponding to another first command to the first chip-enable-signal controlled area through the channel.

17. The data reading method according to claim 11, wherein the flash memory controller operates in a cache access mode.

18. The data reading method according to claim 11, wherein the first command and the second command together form a read command sequence, and there is no command instructing the first chip-enable-signal controlled area to read another operating temperature information in another read command sequence transmitted before or after the read command sequence.

19. The data reading method according to claim 11, wherein in response to the transmission of the second command, the flash memory controller determines to receive the stored data or the operating temperature information according to an address receiving command corresponding to the second command.

20. The data reading method according to claim 11, wherein the first command and the second command are selected from a command set defined in an Open NAND Flash Interface (ONFI) specification.

* * * * *